United States Patent [19]

Janoski

[11] E Patent Number: Re. 33,202

[45] Reissued Date of Patent: Apr. 24, 1990

[54] ENERGY TRANSMISSION DEVICE

[75] Inventor: Florian B. Janoski, Allentown, Pa.

[73] Assignee: Atlas Powder Company, Dallas, Tex.

[21] Appl. No.: 754,727

[22] Filed: Jul. 15, 1985

Related U.S. Patent Documents

Reissue of:

[64] Patent No.: 4,290,366
Issued: Sep. 22, 1981
Appl. No.: 57,898
Filed: Jul. 16, 1979

[51] Int. Cl.[5] ..... F42B 3/10

[52] U.S. Cl. ..... 102/202.3; 102/275.3; 102/275.8; 102/275.12

[58] Field of Search ..... 102/202.3, 275.3, 275.4, 102/275.5, 275.8, 275.12

[56] References Cited

U.S. PATENT DOCUMENTS

| | | | |
|---|---|---|---|
| 2,113,004 | 5/1936 | Snelling | 102/8 |
| 2,774,306 | 12/1956 | MacLeod | 102/27 R |
| 2,923,239 | 7/1957 | Andrew et al. | 102/275.4 |
| 3,317,361 | 10/1965 | Hopper | 149/18 |
| 3,320,883 | 5/1967 | Welsh | 102/27 R |
| 3,590,739 | 7/1968 | Persson | 102/27 |
| 3,730,096 | 12/1970 | Prior | 102/27 |
| 3,851,587 | 12/1973 | Alchorn et al. | 102/27 |
| 3,867,884 | 2/1975 | Langrish-Smith et al. | 102/27 R |
| 3,908,509 | 9/1975 | Kelly et al. | 102/27 X |
| 3,968,724 | 7/1976 | Kovvalick et al. | 102/27 X |
| 4,024,817 | 5/1977 | Calder, Jr. | 102/27 X |
| 4,083,305 | 4/1976 | Garrison et al. | 102/27 |
| 4,232,606 | 11/1980 | Yunan | 102/275.8 |

FOREIGN PATENT DOCUMENTS

| | | |
|---|---|---|
| 194301 | 6/1958 | Austria . |
| 217931 | 10/1961 | Austria . |
| 90126 | 7/1959 | Fed. Rep. of Germany . |
| 1051707 | 8/1959 | Fed. Rep. of Germany . |
| 2519113 | 7/1988 | Fed. Rep. of Germany . |
| 20850 | 4/1950 | German Democratic Rep. . |
| 728240 | 6/1953 | United Kingdom . |
| 746843 | 2/1954 | United Kingdom . |
| 849133 | 7/1958 | United Kingdom . |
| 847743 | 5/1959 | United Kingdom . |
| 1016404 | 7/1964 | United Kingdom . |
| 1196435 | 6/1967 | United Kingdom . |
| 1238503 | 7/1968 | United Kingdom . |
| 1582903 | 1/1978 | United Kingdom . |
| 2035520 | 11/1979 | United Kingdom . |

OTHER PUBLICATIONS

Statement in Support of Opposition Lodged Against Norwegian Patent Application No. 802,127.
Swedish Accepted Specification No. 333,321.
An Article, *Nitrocellose,* Military Pyro-Technics Series-Part Three, U.S. Army Material Command, Oct. 1963, pp. 218-219.

*Primary Examiner*—Peter A. Nelson
*Attorney, Agent, or Firm*—Richards, Medlock & Andrews

[57] ABSTRACT

A low brisance energy transmission device comprising an elongated tube containing self-oxidizing material loosely contained therein is provided. The energy transmission device is able to transmit and propagate energy across bends, kinks, knots, crimps or cuts in the tubing.

29 Claims, 1 Drawing Sheet

ENERGY TRANSMISSION DEVICE

Matter enclosed in heavy brackets [ ] appears in the original patent but forms no part of this reissue specification; matter printed in italics indicates the additions made by reissue.

BACKGROUND OF THE INVENTION

This invention relates to energy transmission means. More particularly, this invention relates to the detonation of explosives. In still another aspect, this invention relates to a novel, low energy transmission means for transferring an explosive signal from the blaster to the remote location of a receptor blasting cap, or to a signal time delay element, or to a signal relay element, or the like.

There are three major methods of igniting detonators which are used, for example, by the mining industry. They are: electric ignition, powder fuse ignition and ignition by means of a detonating cord.

In commercial mining, quarrying, tunneling and shaft work, the most popular and widely used method of blast initiation involves the use of electric blasting caps. Electric blast initiation is considered by most to be the safest method since it enables the blaster to electrically check all blasting caps before, as well as after they are loaded into the blasting site, such as a borehole. The whole, or any part of the electric blasting circuit can be checked with an approved blaster's galvamometer or an approved blaster's multimeter. The probability of encountering unexploded explosives in, for example, a muck pile, is greatly reduced. Risk of injury from accidentally digging into the explosives is also greatly reduced. In the electrical ignition method, each detonator is ignited by means of an electric current transmitted through insulated wires and generated by a current source placed at a safe distance from the explosive. The advantage of this method is that precise timing of detonation is possible facilitating the highly coordinated ignition of a series of charges. However, there are those who feel that the advantages of electric ignition are outweighed by the potential for inadvertent energizing of all or part of the electric blasting circuit by extraneous electricity.

The powder fuse ignition system ignites the detonator by combustion which is initiated at a safe distance and propagated along the train of powder to the detonator. Because of the relatively slow rate of combustion and variation in the rate caused by uneven distribution of the powder, powder fuse ignition systems do not provide an adequate means of ignition where short itervals between initiation and detonation are required.

The third method for igniting detonators is the detonating cord method which involves the propagation of the detonation energy along the cord to the detonating device. In order to insure propagation of the detonation energy to the detonating device or explosive, a conventional detonating cord usually contains between 4 and 400 grains of high explosive per linear foot. The explosive is typically PETN, RDX or TNT having a bulk density greater than 1.0 gram per cubic centimeter and a detonation velocity of about 20,000 feet per second. The high density and high detonation velocity of these materials produce a high brisance detonation which is capable of initating most cap-sensitive explosives. A major disadvantage of this conventional detonating cord is that the side blasting which necessarily results from its use may give rise to undesirable, or premature, detonation of explosives other than those intended to be detonated. For example, if a length of conventional detonating cord is placed in a borehole alongside an explosive charge, with the object of obtaining bottom hole initiation, it frequently occurs that the side blast of the detonating cord is sufficiently intense to initiate the main charge in the upper portion of the borehole resulting in poor rock breakage. If, in an effort to avoid this problem, a relatively insensitive blasting charge is used in place of a cap-sensitive charge, the explosive may not be initiated by the detonating cord but is frequently compressed to a state of insensitivity by the powerful blast of the detonating cord. Under these circumstances, the main charge may fail to detonate at all or may be partially detonated or detonation may occur at a reduced velocity.

When conventional type detonating cord is used above ground, its excessive power causes noise and air blasts which are unacceptable in populated areas and may cause injury because of flying debris.

A low energy detonation tube has been disclosed in U.S. Pat. No. 3,590,739 which attempts to solve the problem of excessive brisance by leaving the tube hollow and applying only a thin coating of explosive dust on its inner wall. Upon initiation, a detonating wave is generated which travels through the hollow tubing. One main disadvantage of this device is that a bend, kink, knot, crimp or cut in the tubing can sometimes stop propagation of the detonating wave. Also, unequal distribution of the explosive as a result of flaking may lead to dangerously high local concentrations of the explosive at some points in the tube.

Thus, a need has arisen for a detonating cord or energy transmission device which has a low brisance so as to prevent non-intended detonations and other accidents due to side blasts. At the same time, it is desirable that such device develop enough detonating force to pass through minor barriers or air gaps which might occur due to crimping, kinking or bending of the cord, and to eliminate the possibility of the explosive settling within the tube.

SUMMARY OF THE INVENTION

According to the invention, a low brisance energy transmission device is provided which comprises an elongated flexible tube having loosely contained therein and extending substantially throughout the length thereof, i.e., in a generally uniformly distributed manner, a self-oxidizing material having a detonation rate of at least 1,000 feet per second.

In alternate embodiments, the self-oxidizing material contained within the flexible tube can comprise a monofilament or multifilament, or fine, hairlike strands of material that loosely fills the flexible tubing. The self-oxidizing material can also be nonoriented in a fluffed loose fill approximating lint or cotton in appearance. In addition, the self-oxidizing material contained within the flexible tubing can also be coated with or contain other explosive modifying materials to, for example, alter the density and/or detonation rate of the self-oxidizing material.

The self-oxidizing material contained within the elongated tube has structural integrity so that if the tube is bent, kinked, knotted, crimped or cut, the self-oxidizing material can propagate its rapid oxidation through the point where the tube is bent kinked, knotted, crimped or cut once oxidation is initiated.

BRIEF DESCRIPTION OF THE DRAWINGS

A more complete understanding of the invention may be had by reference to the following detailed description when taken in conjunction with the accompanying drawings wherein.

DETAILED DESCRIPTION OF THE INVENTION

Figure 1:
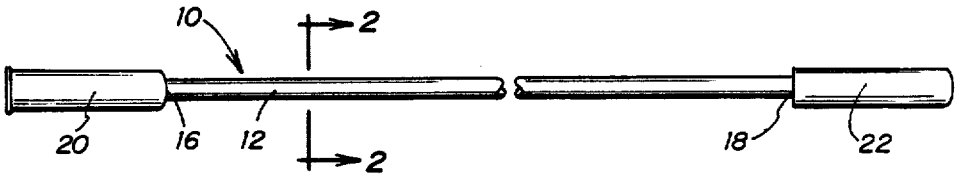
FIG. 1 illustrates a system for detonating high explosives employing the energy transmission device of the subject invention.
Figure 2:
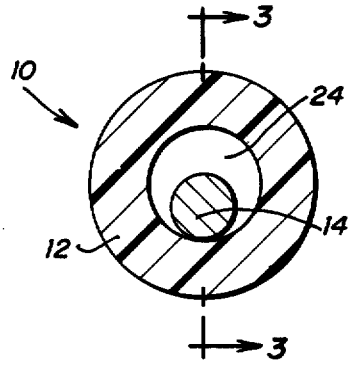
FIG. 2 illustrates a sectional view of the energy transmission device of FIG. 1 along lines 2—2 of FIG. 1.

Referring now to the drawings, and particularly to FIG. 1, there is shown a system for detonating high explosives employing an energy transmission device 10 of the present invention. Energy transmission device 10 comprises an elongated tube 12 that contains self-oxidizing material loosely contained therein, for example, in one embodiment as filament 14 (FIG. 2).

While elongated tube 12 can be of any desired shape, elongated tube 12 is preferably of generally circular cross-section. Elongated tube 12 is also preferably formed of a relatively flexible polymeric material, although elongated tube 12 of energy transmission device 10 can be made of material that is rigid. As used herein, the term "flexible" refers to the ability of elongated tube 12 to bend longitudinally. Preferably, elongated tube 12 is made from a nonelastomeric polymeric material. Examples of acceptable materials include polyethylene, polypropylene, polyvinylchloride, polybutylene, ionomers, nylons and the like.

The outer diameter of elongated tube 12 is preferably about ⅛" and the internal diameter is preferably about 1/16". The practical range of the outer diameter is from about 1/16" to about ¼" and the practical range of the internal diameter is from about 1/32" to about 3/32".

In selecting an outer diameter, internal diameter and material of construction for elongated tube 12, it is desirable to consider the energy that self-oxidizing material 14 will release during oxidation so that elongated tube 12 can be designed to avoid rupturing. In this manner, accidental initiation of other explosive devices located proximately to energy transmission device 10 can be substantially eliminated. Also, destruction or injury to the surroundings will also be similarly eliminated.

As shown in FIG. 1, energy transmission device 10 has a first end 16 and a second end 18. An initiator device, such as a caliber 0.22 blank cartridge 20, can be connected to first end 16 of energy transmission device 10. The second end 18 of energy transmission device 10 is connected to a receptor such as blasting cap 22 which is suitable for initiating an explosive charge (not shown).

Figure 3:
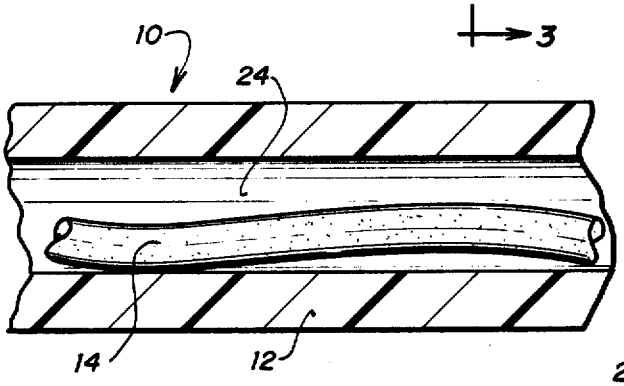
FIG. 3 illustrates a longitudinal cross-sectional view of the energy transmission device shown in FIG. 2 along lines 3—3 of FIG. 2.

FIG. 2 shows a cross-sectional view of one embodiment of energy transmission device 10 along lines 2—2 of FIG. 1. Contained within elongated tube 12 is a continuous mass of self-oxidizing material as filament 14 as shown in FIGS. 2 and 3. Filament 14 can be a monofilament or a multifilament in the form of a woven or spun thread, for example. Preferably, filament 14 is loosely contained inside elongated tube 12, so that an air space 24 exists within the hollow portion of elongated tube 12. Filament 14 is preferably attached to a sidewall or sidewalls adjacent ends 16 and 18 of elongated tube 12 by adhesion or crimping of tube 12, for example.

Figure 4:
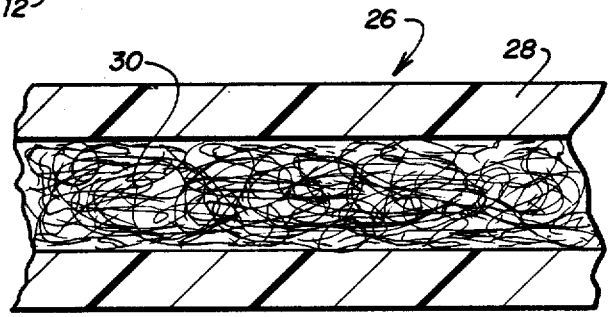
FIG. 4 illustrates a longitudinal cross-sectional view of the energy transmission device of the present invention containing an alternate embodiment of the self-oxidizing material.

The self-oxidizing material can take various forms, but is always loosely contained within the interior of the elongated tube 12. By "loosely contained" it is herein understood that the self-oxidizing material while being contained by the sidewalls of the elongated tube, is not necessarily attached or affixed to the interior thereof. It is only necessary that the self-oxidizing material be either continuously or discontinuously distributed throughout the entire length of the elongated tube 12 sufficient to propagate a hot gas wave as a plasma therethrough. The self-oxidizing material can be manufactured so that it possesses sufficient structural integrity as a body loosely contained throughout the length of the elongated tube 12 such as filament 14 which is illustrated in FIGS. 2 and 3. Alternately, the self-oxidizing material can rely on the structural integrity of sidewalls of elongated tube 12 to maintain its integrity as a continuous mass or discontinuous masses of self-oxidizing material. For example, in one embodiment, fine, hairlike strands of self-oxidizing materials can be used to loosely fill the entire interior of elongated tube 12 or continuous portions of elongated tube 12. The strands can be fluffed into a loose fill approximating link or cotton in appearance and texture. FIG. 4 illustrates this embodiment in which energy transmission device 26 includes elongated tube 28 that contains self-oxidizing material 30 which approximates the appearance and texture of cotton.

Figure 5:
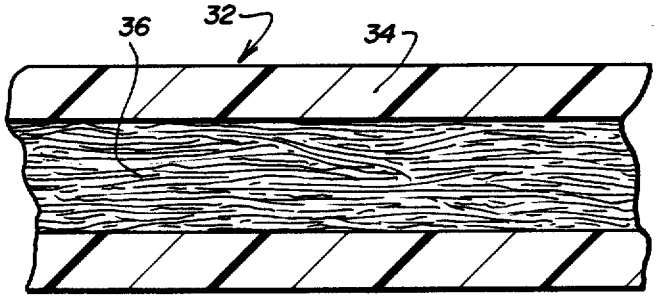
FIG. 5 illustrates a longitudinal cross-sectional view of the energy transmission device of the subject invention containing an alternate embodiment of the self-oxidizing material.

In another embodiment, the self-oxidizing material can be multi-segments of a self-oxidizing thread or strand. The self-oxidizing material can be in the form of a monofilament or multifilament woven or spun thread. The thread can also be contained in elongated tube 12 in an intermittent and overlapping form. FIG. 5 illustrates an embodiment in which energy transmission device 32 includes elongated tube 34 that contains self-oxidizing material 36 which is in the form of intermittent and overlapping strands.

The self-oxidizing material, in any of the embodiments set forth above, the particularly in the form of nonoriented, fluffed or oriented fill as illustrated in FIGS. 4 and 5, can be continuous or discontinuous within the guide tubing (elongated tube 12). It is only necessary that once the self-oxidizing material is initiated it explodes or rapidly oxidizes causing a shock and hot gas wave to be propagated as a plasma within the guide tubing from the initiation end to some distal end where said shock and heat energy can perform a useful function, such as the initiation of a blasting cap, a delay element, or a relay element, or the like. Thus, discontinuities can occur in the self-oxidizing material throughout the length of elongated tube 12 so long as the hot gas wave which is propagated as a plasma within elongated tube 12 is able to breech the discontinuity and initiate the self-oxidizing material adjacent the discontinuity but forward of the direction which the plasma front is traveling within elongated tube 12. The plasma front has successfully breeched discontinuities of 11 inches in the energy transmission device of the subject invention.

The detonation rate of the self-oxidizing material should be in excess of 1,000 ft. per second, preferably the detonation rate of the self-oxidizing material is from about 4,000 ft. per second to about 6,000 ft. per second. The detonation rate can be varied by varying the composition of the self-oxidizing material. Any self-oxidizing material which is capable of being formed in a monofilament or multifilament, as disclosed above, and being contained loosely within said elongated tube 12, and having a detonation rate in excess of 1,000 ft. per second, and capable of propagating an explosive signal (a plasma) throughout elongated tube 12 without rupturing said tube can be used according to the invention. In one embodiment, the self-oxidizing material is nitrated cellulose. Such nitrated cellulose includes both unmodified nitrated cellulose and chemically modified nitrated cellulose, by halogenation, for example. Alternately, the self-oxidizing material can be made from molded or extruded filaments of flexible plasticized explosives. For example, in one embodiment the self-oxidizing material can be made from highly moisture insensitive flexible plasticized exposives either in multifilament or monofilament form containing RDX or HMX or the like. Suitable such filaments can be extruded or molded from flexible plasticized explosive compositions made in accordance with the teachings in U.S. Pat. No. 3,400,025 and U.S. Pat. No. 3,317,361 which are herein incorporated by reference into this specification. The detonation rate of the self-oxidizing material can also be varied by selectively coating the surface of the self-oxidizing material with modifying materials such as flaked or atomized aluminum, RDX, HMX, PETN, and similar materials. In addition, when utilizing the embodiments as set forth in FIGS. 4 and 5, for example, the fine strands of self-oxidizing material can be coated with modifying materials, such as described above or the modifying materials can be loosely dispersed within the mass of the strands.

The self-oxidizing material contained with elongated tube 12 preferably has structural integrity which, even when elongated tube 12 is bent at least 180°, permits propagation of detonation energy and allows continued oxidation of the self-oxidizing material through the point of bend. Thus, should energy transmission device become bent, kinked, crimped, knotted, nicked or cut in a borehole, for example, the energy transmission device will not fail to transmit and propagate the explosive signal to a receptor such as blasting cap 22.

Energy transmission device 10 of the present invention can be initiated by a small percussion cap, such as a caliber 0.22 blank cartridge 20. Once energized, energy transmission device 10 transfers an explosive signal from the initiator such as the caliber 0.22 blank cartridge 20 as shown in FIG. 1 to the remote location of a receptor such as blasting cap 22. Alternatively, energy transmission device 10 can transfer the explosive signal to a signal time delay element, or to a signal relay element, or any desired type of element.

The embodiments of the self-oxidizing materials shown in FIGS. 1–5 have sufficient tensile or structural integrity so that when the elongated tube is bent, crimped, knotted, kinked or cut, termination of the propagated energy by the bend, crimp, knot, kink or cut will be avoided.

As will be apparent to those of ordinary skill in the art upon reading the present disclosure, many variations, alterations, substitutions and equivalents are applicable to the various disclosed embodiments of the present invention. It is the intent, however, that the concepts disclosed herein be limited only by the appended claims.

What is claimed is:

1. An energy transmission device for transmitting an explosive signal from an initiator to a receptor comprising:

(a) an elongated tube; and (b) a self-oxidizing material loosely contained within said tube and extending substantially along the length of said tube for propagating an explosive signal through said tube, *said self-oxidizing material having a detonation rate of at least about 4,000 ft. per second when contained in said tube.*

[2. The energy transmission device of claim 1 wherein said self-oxidizing material has a detonation rate of at least 1,000 ft. per second.]

3. The energy transmission device of claim 1 wherein said self-oxidizing material is in a filament form selected from monofilaments and multifilaments.

4. The energy transmission device of claim 1 wherein said self-oxidizing material has a detonation rate of at least [1,000] *about 4,000* ft. per second to about 6,000 ft. per second, *when contained in said tube.*

5. The energy transmission device of claim 1 wherein said elongated tube is flexible.

6. The energy transmission device of claim 1, [2,] 3, 4, or 5 wherein said self-oxidizing material comprises a continuous strand extending throughout said tube.

7. The energy transmission device of claim 6 wherein said self-oxidizing material comprises nitrated cellulose.

8. The energy transmission device of claim 6 wherein said self-oxidizing material comprises a moisture insensitive plasticized explosive material.

9. The energy transmission device of claim 1, [2,] 3, 4, or 5 wherein said self-oxidizing material comprises a loose mass of multifilaments within said elongated tube.

10. The energy transmission device of claim 9 wherein said self-oxidizing material comprises nitrated cullulose.

11. The energy transmission device of claim 9 wherein said self-oxidizing material comprises a moisture insensitive plasticized explosive material.

12. The energy transmission device of claim 9 wherein said mass is continuous throughout the interior of said elongated tube.

13. The energy transmission device of claim 9 wherein said mass is discontinuous, but substantially uniformly deposited throughout the interior of said elongated tube.

14. The energy transmission device as recited in claim 1, [2,] 3, 4 or 5 wherein said elongated tube is made from a flexible nonelastomeric polymer material.

15. The energy transmission device of claim 14 wherein said polymer material is selected from the group consisting of polyethylene, polypropylene, polyvinylchloride, and polybutylene.

16. The energy transmission device of claim 1, [2,] 3, 4, or 5 wherein the outer diameter of said elongated tube is from about 1/16 inch to about ¼ inch and the inner diameter of said elongated tube is from about 1/32 inch to about 3/32 inch.

17. An elongated tubular energy transmission device capable of propagating a detonation signal through a 180° bend therein comprising:

(a) a flexible, elongated tube; and (b) a continuous mass of self-oxidizing material loosely contained within said tube and extending along the entire length of said tube wherein said self-oxidizing material has a detonation rate of between about [1,000 ft.] *4,000* per second and 6,000 ft. per second *when contained in said tube* and has structural integrity to permit bending of said elongated tube at least 180° without serving said self-oxidizing material.

18. The energy transmission device of claim 17 wherein said self-oxidizing material is in the form of a strand made from material selected from monofilaments and multifilaments.

19. The energy transmission device of claim 17 wherein said self-oxidizing material is in the form of a continuous mass of multifilaments.

20. The energy transmission device of claim 17, 18 or 19 wherein said self-oxidizing material comprises nitrated cellulose.

21. The energy transmission device of claim 17, 18 or 19 wherein said self-oxidizing material comprises a moisture insensitive plasticized explosive.

22. The energy transmission device of claim 17, 18 or 19 wherein said elongated tube is made from a nonelastomeric polymer.

23. The energy transmission device of claim 22 wherein said polymer is selected from the group consisting of polyethylene, polypropylene, polyvinylchloride, and polybutylene.

24. A method of detonating a high explosive in contact with a blasting cap comprising: connecting a tubular member between an initiation device means and said blasting cap, said tubular member comprising an elongated tube containing self-oxidizing material, said self-oxidizing material being in the form of a continuous mass loosely contained in said elongated tube and extending substantially along the length of said tube; and activating said initiator device to cause sequential oxidation of said self-oxidizing material, said blasting cap and said explosive, said oxidation of said self-oxidizing material resulting in a plasma front being transferred from said initiator device to said blasting cap.

25. The method as recited in claim 24 wherein said self-oxidizing material has a detonation rate of at least [1,000] *about 4,000* ft. per second, *when contained in said tube.*

26. The method of claim 24 wherein said self-oxidizing material has a detonation rate of at least [1,000] *about 4,000* ft. per second to about 6,000 ft. per second, *when contained in said tube.*

27. The energy transmission device of claim 14 wherein said polymer material is nylon.

28. The energy transmission device of claim 14 wherein said polymer material is an ionomer resin.

29. The energy transmission device of claim 22 wherein said polymer material is nylon.

30. The energy transmission device of claim 22 wherein said polymer material is an ionomer resin.

* * * * *